(12) United States Patent
Johnson et al.

(10) Patent No.: US 9,058,729 B2
(45) Date of Patent: Jun. 16, 2015

(54) IN-SITU OVERHEAT ALERT FOR EQUIPMENT

(75) Inventors: Nancy L. Johnson, Northville, MI (US); Alan L. Browne, Grosse Pointe, MI (US); Roland J. Menassa, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 315 days.

(21) Appl. No.: 13/613,032

(22) Filed: Sep. 13, 2012

(65) Prior Publication Data

US 2014/0069317 A1   Mar. 13, 2014

(51) Int. Cl.
| | |
|---|---|
| *G01B 5/02* | (2006.01) |
| *G08B 21/18* | (2006.01) |
| *G01K 1/02* | (2006.01) |
| *G01K 5/54* | (2006.01) |
| *G01K 5/56* | (2006.01) |
| *G08B 5/02* | (2006.01) |

(Continued)

(52) U.S. Cl.
CPC .. *G08B 5/02* (2013.01); *G01K 1/02* (2013.01); *G08B 17/02* (2013.01); *G08B 17/04* (2013.01); *G08B 21/187* (2013.01)

(58) Field of Classification Search
CPC ........... G01K 1/02; G01K 5/48; G01K 5/483; G01K 5/50; G01K 5/52; G01K 5/54; G01K 5/56; G01K 5/58; G01K 5/60; G01K 5/62; G01K 5/64; G01K 5/68; G01K 5/70; G01K 5/72; G08B 5/02; G08B 17/02; G08B 17/04; G08B 21/18; G08B 21/187

USPC .......... 116/216, 221, 101, 102; 374/141, 142, 374/187, 188, 195, 198, 199, 200, 201, 205
See application file for complete search history.

(56) References Cited

U.S. PATENT DOCUMENTS

| 884,973 A | * | 4/1908 | Ayer | 116/221 |
| 3,214,278 A | * | 10/1965 | Mylo | 116/221 |
| 4,089,222 A | * | 5/1978 | Perkins | 116/101 |

(Continued)

FOREIGN PATENT DOCUMENTS

| CN | 201100848 Y | * | 8/2008 | G01K 5/62 |
| CN | 202126313 U | * | 1/2012 | G01K 5/62 |

(Continued)

*Primary Examiner* — Richard A Smith
(74) *Attorney, Agent, or Firm* — Reising Ethington P.C.

(57) ABSTRACT

Malfunction or failure of mechanical, electrical and electro-mechanical equipment, for example equipment used in manufacturing operations, is often preceded by an increase in the operating temperature of at least some portion of the equipment. A temperature-sensitive, active material-containing actuator is pre-selected to operate at a pre-determined temperature indicative of impending equipment failure and placed in thermal contact with the equipment. If the equipment achieves the pre-selected temperature the actuator signals this by displaying a flag or providing some other passive visual indication. Alternatively, or additionally, the actuator may issue an electrically-powered alert including visual or audible alerts or a wireless communication. Selected actuators are based on smart materials including shape memory alloys (SMA), shape memory polymers (SMP) and paraffin wax, all of which may be adapted to operate over a temperature range sufficient to encompass the expected range of pre-determined temperatures.

20 Claims, 6 Drawing Sheets

(51) Int. Cl.
  *G08B 17/02* (2006.01)
  *G08B 17/04* (2006.01)

(56) References Cited

U.S. PATENT DOCUMENTS

| | | | | |
|---|---|---|---|---|
| 4,243,632 A | * | 1/1981 | Ryder | 422/119 |
| 4,251,719 A | * | 2/1981 | Ryder | 219/521 |
| 4,541,735 A | * | 9/1985 | Abu-Isa | 374/188 |
| 4,601,200 A | * | 7/1986 | Stoffelen | 73/290 V |
| 4,818,119 A | * | 4/1989 | Busch et al. | 374/208 |
| 5,076,197 A | * | 12/1991 | Darringer et al. | 116/221 |
| 5,366,292 A | * | 11/1994 | Voss | 374/188 |
| 5,735,607 A | | 4/1998 | Shahinpoor et al. | |
| 6,422,171 B1 | * | 7/2002 | Betts | 116/221 |
| 6,425,343 B1 | | 7/2002 | Akers et al. | |
| 6,561,121 B1 | * | 5/2003 | Rose | 116/216 |
| 6,612,739 B2 | | 9/2003 | Shahinpoor | |
| 6,837,620 B2 | | 1/2005 | Shahinpoor | |
| 7,628,116 B2 | * | 12/2009 | Browne et al. | 116/216 |
| 2005/0105587 A1 | * | 5/2005 | Shahinpoor | 374/205 |
| 2005/0199845 A1 | * | 9/2005 | Jones et al. | 251/129.06 |
| 2006/0049910 A1 | * | 3/2006 | Bolda et al. | 337/139 |
| 2008/0272259 A1 | | 11/2008 | Zavattieri et al. | |
| 2011/0271832 A1 | * | 11/2011 | Kara et al. | 95/25 |

FOREIGN PATENT DOCUMENTS

| | | | | |
|---|---|---|---|---|
| JP | 01287995 A | * | 11/1989 | H05K 3/46 |
| KR | 2010006472 U | * | 6/2010 | G01K 5/62 |

* cited by examiner

IN-SITU OVERHEAT ALERT FOR EQUIPMENT

TECHNICAL FIELD

This disclosure pertains to devices adapted to fit on equipment, such as is used, for example, in manufacturing operations, each fitted-device serving to give notice of overheating of the machine to which it is attached or thermally connected. More specifically, this disclosure pertains to devices in which selected materials that are physically transformed at a predetermined machine-overheat temperature, respond to release a visible overheat flag or sign. The release of the visible overheat sign can be further used to initiate an audible warning signal, and can also initiate a signal for preserving a record of the overheating event.

BACKGROUND OF THE INVENTION

Modern manufacturing operations and other operating devices use many types of equipment that are subjected to loads that cause heating in portions of the particular machine or unit. Sometimes the heating occurs in electrically powered equipment, such as electric motors, welding transformers, and welding guns. The heating may also occur in equipment such as gear boxes and machining equipment that experience frictional loading. Often the equipment is used in circumstances that make maximum use of its design capabilities and may result in substantial heat generation within a particular heavily loaded, manufacturing unit. Further, the equipment may be expected to operate with minimal operator attention or oversight.

Thus, there is a need for inexpensive and low energy-consuming devices that may be adapted to function autonomously as a temperature monitor, providing an overheat signal or over-temperature signal, for the particular environment of many different machines used in manufacturing or other operations. There is a need for such devices to fit, non-obtrusively, on or in thermal contact with the equipment, or within the equipment, and to give a visible warning signal if, or when, some portion of the equipment reaches a temperature that indicates that it is overheating, which is likely to be harmful to its continued operation.

SUMMARY OF THE INVENTION

This invention provides devices that are adapted for placement on (or in thermal contact with) a surface of an operating unit of equipment, machine, or the like, for the purpose of raising a visible, tabular, warning flag when the operating machine unit is experiencing overheating. The up-standing warning flag is sized and located to inform nearby operating personnel that the operating unit is in danger of being damaged by its overheated condition.

Each such in-situ, overheating-detection device is shaped, or otherwise adapted, to be placed on a selected surface of the equipment, often a surface that is visible to someone in the vicinity of the equipment as it is being operated. The selected surface region of the equipment unit will serve as a useful sensing location if the unit experiences an overheating condition of operation. During operation of the equipment, heat will be transferred from the selected surface of the unit into a special material portion of the in-situ device. The special material is sometimes referred to in this specification as an "active" material or as a "smart" material. The material is characterized as active or smart because it is composed or adapted to experience a physical transformation when it is heated to a temperature range indicative of overheating in the equipment on which it is placed or in intimate thermal contact. This transformation of the active material is used to raise (or otherwise re-position) the tabular flag member to a position in which it is visible, or may otherwise give its notice of machine overheating.

As will be more fully described in this specification, examples of suitable active materials include linear shapes of shape memory alloy compositions, sheets or other suitable shapes of shape memory polymers or other polymer compositions, and certain confined volumes or bodies of organic paraffin materials. As stated, the active material is selected, composed, or otherwise adapted to experience a useful physical transformation when it is heated by its contacting equipment unit to a temperature, or narrow temperature range, indicative of overheating within the machine that it serves. Often such a temperature may be in the range of about 70° C. to about 100° C. and higher. The active material will lie inactive, in suitable close heat transfer relationship with the equipment surface, during normal temperature operation of the equipment. But when the active material is heated to a temperature, indicative of overheating of the equipment, the active material will transform in its composition and shape so as to serve as an actuator of a warning flag, stored on the subject in-situ device. The actuated flag or tab will be moved (sometimes simply rotated) to a position away from the surface of the overheated equipment so as to give appropriate notice of the sudden and potentially damaging, over-temperature condition of the equipment unit.

In many embodiments of the invention, an in-situ device will comprise an over-temperature, alarm-giving, tabular flag and a suitable body of active material for sensing an over-temperature condition of a unit of manufacturing equipment. The flag tab is suitably formed of metal, polymer, wood, or other solid material and may often have a generally flat rectangular shape. It may be brightly colored or coated to more-readily present its alarm-giving message. The flag member is usually stored in a concealed position near the surface of the equipment that the in-situ warning device is serving. In many embodiments of the invention, the flag is held in its stored condition against the force of a coiled spring, capable, upon a release, of quickly rotating the flag about one of its ends into its over-temperature, notice-giving position. When the active material is heated above its selected transformation temperature, the material changes shape in a manner that triggers the spring to move the flag from its stored position to its notice-giving or alarm-giving position. The flag may be brightly colored so as to be readily visible, and to give prompt notice to a worker in the vicinity of the over-heated machine, so that it may be shut down or its work-load reduced. In some embodiments of the invention, the movement of the flag to its notice-giving position may also be used to initiate an audible signal, or a more widely visible bright-light signal, of the over-temperature condition of the manufacturing unit. In other embodiments, the relocated flag may also close a circuit to initiate an electronic signal to a computer or other device for recording the over-temperature event or for a computer-initiated change in the loading or operation of the equipment unit or associated equipment.

It will be appreciated that the respective components of the in-situ over-temperature device may be contained within a suitable housing for maintaining the working relationship of the active material, spring(s), flag tab(s), and other components of the subject device. The overall shape of the device is managed to enable it to fit the active material in suitable heat transfer contact with a surface of the equipment to be protected or in a position nearby the equipment in a suitable heat transfer relationship with the equipment. The device may also be constructed for re-setting of the flag-member to its stored position after the device has cooled from an overheat condition.

Other objects, advantages, and embodiments of the invention will be apparent from the following detailed descriptions of illustrative embodiments of exemplary subject in-situ over-temperature devices and the environments in which they may be used.

BRIEF DESCRIPTION OF THE DRAWINGS

In FIG. 1A the flag is shown in its stored position and is hidden from view; in FIG. 1B the flag is shown in its deployed configuration where it may be readily seen by an observer.

In FIG. 2A, the flag is shown in its stored position and is hidden from view; in FIG. 2B, the flag is shown in its deployed upright configuration where it may be readily seen by an observer.

In FIG. 3A the flag is shown in its stored position and is hidden from view; in FIG. 3B the flag is shown in its upright deployed configuration where it may be readily seen by an observer.

In FIG. 4C, the device is shown in thermal communication with a bearing shell, representative of a unit of manufacturing equipment to which the device may be applied. In FIG. 4A the flag is shown in its stored position; in FIG. 4B the flag mechanism has been triggered by the active material device but full deployment of the flag has not occurred; and in FIG. 4C the flag is shown in its deployed configuration and is readily visible to an observer.

DESCRIPTION OF PREFERRED EMBODIMENTS

Figure 1A:
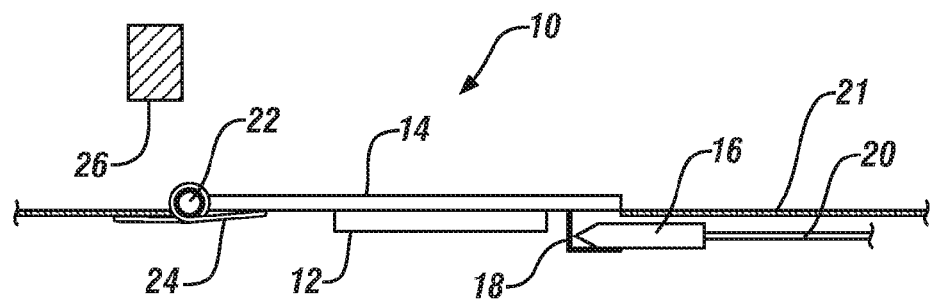
FIGS. 1A and 1B show, in sectional views, and in isolated grouping, a first representative mechanism for deploying and making visible a flag or similar visual indicator.

The subject invention provides in-situ overheat detecting devices to protect operating machines and equipment. The devices are shaped to be placed on a surface of the machine which would experience a temperature increase when the machine experiences overheating. The overheat detecting devices use temperature-sensitive, active material actuators which experience a change in shape or volume when heated by contact with a machine surface to a pre-determined temperature range. Upon undergoing such a shape or volume change, the overheat detecting devices release, or render visible, a 'flag' or similar visual member to alert an operator or passer-by to an over-temperature event. Such a flag or visual indicator may be generally planar and of suitable shape and size, with surface coloration or other indicia to readily call attention to itself. Typically the flag member may be generally rectangular in form and at least one inch in minimum dimension and up to about four inches in maximum dimension. The flag may be an independent body made of, for example, wood, metal, or plastic, or may be a contrasting region of another body, for example a portion of a tab, flap, or door which has been painted or had reflective tape applied. To draw attention to itself, the flag will typically be of a bright color and may preferably be red or yellow since these colors are generally associated with warning signals.

Any of a variety of active, shape, volume, and or stiffness-changing materials may be used, including shape memory alloys (SMAs), shape memory polymers (SMPs) and paraffin actuators. Each of these materials may be formulated to undergo a phase transformation (associated with a shape, stiffness and/or volume change) at a pre-selected temperature (or temperature range), and so may be tailored to undergo such transformation at a temperature suitably indicative of impending overheating of the machine or equipment to which they are to be attached, often a temperature of between 70° C. and 100° C. or even higher. In conjunction with their phase transformation these active materials undergo changes in their shape, stiffness, or volume. With suitable packaging, the shape, stiffness, or volume changes undergone by such materials may be harnessed to perform mechanical work, enabling the positioning of an alarm-giving flag member to indicate overheating in a manufacturing machine.

Such active material actuators therefore enable deployment of these warning flags whenever a piece of equipment attains a temperature indicative of overheating. The active material actuator may deploy such a flag by direct action, but the displacement available from many such active material actuators is limited and so, more commonly, the active material actuator may serve only to release a latch or similar locking mechanism to enable a spring, or similar energy storage device, to move and deploy the flag. In a further embodiment, the device may additionally include a battery and electrically-operated alarm device such as a light, siren, or wireless transmitter with a switch, triggerable by the active material actuator or by the flag itself. Since in some embodiments, the active material actuators may be reversible, the circuit governing operation of such an electrical device may incorporate a latching circuit to ensure that an over-temperature alert, once initiated, may not be cancelled by only a subsequent reduction in temperature.

Because the active material actuating elements of these overheat devices respond to equipment temperature, it is essential that effective thermal contact be promoted between at least the actuator portion of the device and the manufacturing equipment that it is protecting. Often the components of an overheat detection device will be incorporated in a housing or container during their assembly so that they may be easily handled and placed on a machine to be protected. The equipment-contacting surface of the housing may be shaped to generally conform to the equipment surface.

The housing or container may be formed of a material, such as a metal alloy, suitable for withstanding the temperature of the environment in which it is intended to operate and for conducting heat from the manufacturing unit to the actuator member of the device. Physical contact between the subject overheat detection device and the protected equipment may be assured by mechanical attachment, including clamps, screws, bolts, and hook and loop attachments. Physical contact between device and machine may also be maintained by welded, brazed, or soldered connections, or by adhesive attachment using either permanent or releasable adhesives as required. Thermal contact, particularly on rough or irregular equipment surfaces, may be promoted by interposing a suitable, thermally conductive medium between the device and equipment. This could include a metal; say copper, in foil or powder form, or a thermally conductive paste containing metal particles such as silver, or any other thermally conductive media known to those skilled in the art. It will be appreciated that adhesive formulations incorporating such thermally conductive particles may be used to simultaneously secure the active material device to the equipment and to promote good heat transfer.

Although it is often preferred to sense or measure the equipment temperature as accurately as possible, the device may not have to respond to the actual equipment temperature. If a satisfactory correlation may be made between the equipment temperature and some near-by temperature, the near-by temperature may serve as an acceptable surrogate for the equipment temperature. For example, in a piece of equipment which is force-cooled by passage of air, the temperature of the heated exhaust cooling air may serve as an indirect indication of equipment temperature and provide opportunity for application of this approach, provided the trigger temperature required to actuate the active material device is appropriately adjusted.

Figure 1B:
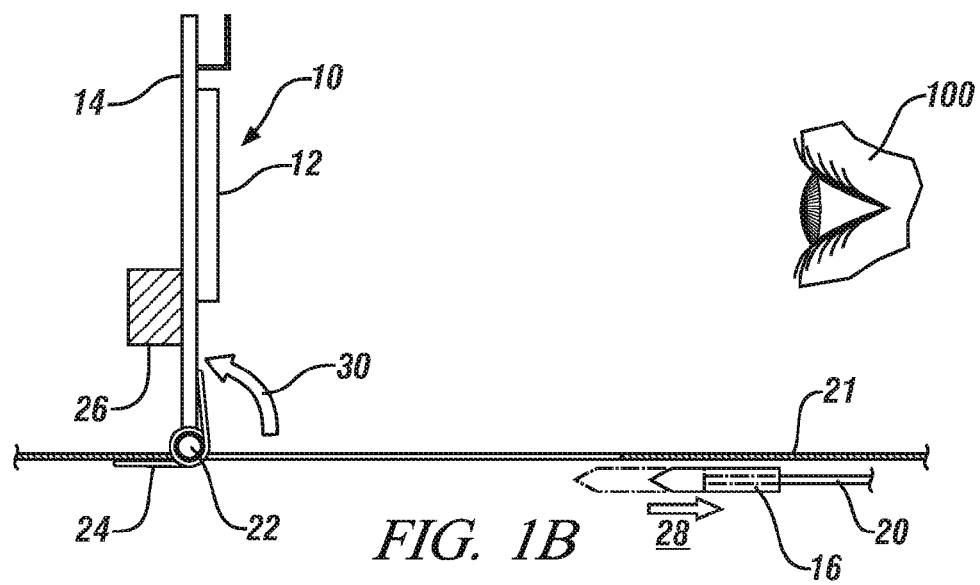

FIGS. 1A and 1B illustrate, as an isolated grouping, the principal operating components of an exemplary overheat detecting device. In a fully assembled device, the illustrated components and others, not shown, may be secured in a housing adapted for placement on or near a surface of a machine and suitable for effectively conveying the machine temperature to the overheat detecting device.

Figure 1C:
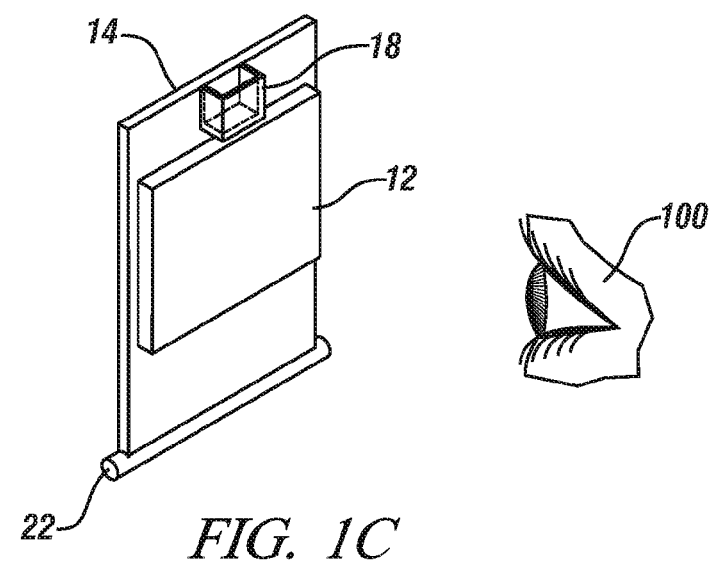
FIG. 1C shows a flag or visual indicator and its support, representative of that shown in FIGS. 1A and 1B, in fragmentary pseudo-perspective view.

Flag 10 (with its viewable surface shown in FIG. 1C) is secured to a portion of a supporting structure 21 at hinge 22. Flag 10 comprises door 14 with visual indicator 12 mounted on its underside. Flag 10 is retained in its closed position by plunger 16 which engages recess 18 mounted on the underside of door 14. The combination of plunger 16 and recess 18 cooperates to restrain door 14 against rotation about hinge 22 under the urging of torsion spring 24. One end of torsion spring 24 is also anchored to the supporting structure 21 in the device.

In FIG. 1B, plunger 16 has been retracted in the direction of arrow 28 under the pull of an active member, a shape memory alloy wire 20, disengaging plunger 16 from recess 18 and permitting torsion spring 24 to rotate flag 10 about hinge 22 in the direction of arrow 30 and to bring the topside of door 14 into contact with stop 26 which serves to maintain flag 10 in a generally upright position. In this position, previously hidden visual indicator 12 is clearly visible to observer 100 as better shown at FIG. 1C which shows visual indicator 12 in quasi-perspective view. Only a portion of shape memory alloy wire 20 is illustrated in FIGS. 1A and 1B, it being understood that the other end of shape memory alloy wire 20 would be anchored within the device.

Plunger 16, in this generic mechanism, is shown as actuated by an SMA wire active member 20. As will become evident below, SMA wire 20 is transformed and activated by heat from an operating machine with which the overheat detection device and active member are associated. In this illustration of FIGS. 1A-1C, and in the further illustration of FIGS. 2A and 2B, the active material actuator is an SMA wire, but those skilled in the art will appreciate that any of the recited active material actuators may be adapted to disengage plunger 16 from recess 18 and trigger the movement of flag 10 to its alarm-giving position. Similarly, although further exemplary embodiments use specific active material actuators, as depicted and described below, such illustrations are not intended to suggest that such embodiments are limited to the use of only the illustrated actuators. Also, although the method of promoting actuation of the device has been illustrated using a particular latching mechanism with a specific release mode, such illustration is intended to be exemplary only and not prejudicial to the use of other latching mechanisms and release modes.

Figure 2A:
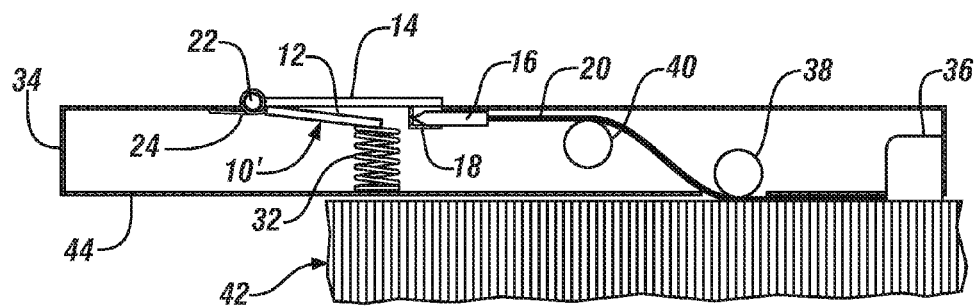
FIGS. 2A and 2B show, in sectional views, a second representative mechanism for deploying and making visible a flag or similar visual indicator, here shown integrated into a active material device employing a linear shape memory alloy (SMA) actuator. The device is here shown with its bottom side and linear actuator in thermal communication with a lamination stack from a transformer used to power a weld gun, as representative of the manufacturing equipment to which the device may be applied.

An alternate embodiment, illustrating a sheet metal device housing and supporting structure 34 and additional features of an in-situ overheat alert device, is shown in FIG. 2A. Here, supporting structure 34, which has a planar underside 44, is shown in surface-to surface, thermal and mechanical contact with a substantially planar surface of a lamination stack 42. Lamination stack 42 is illustrated as part of a transformer, for example, for an electrical resistance weld gun. As in the embodiment of FIG. 1A, door 14 is secured in its closed position by the cooperative interaction of plunger 16 and recess 18. In this embodiment flag 10', comprising visual indicator 12 and spring 32, is contained in the interior volume of housing and supporting structure 34. SMA wire 20 is secured at one end to plunger 16 and at its second end to mounting block 36 and routed, over at least a portion of its length, proximate to underside 44 of supporting structure 34 so that it may be in thermal communication with lamination stack 42. It will be appreciated that any flexible elongated SMA element such as a tape, cable, spring, or chain may be substituted for wire 20. Further, in some embodiments, only that portion of the flexible linkage in thermal contact with the equipment may be fabricated of SMA with the remaining length being a flexible, non-SMA wire or cable. The operative linkage may be maintained in a modestly-tensioned state by, for example, a spring (not shown) and routed over pulleys (not shown) or guide pins 38, 40 as necessary.

Figure 2B:
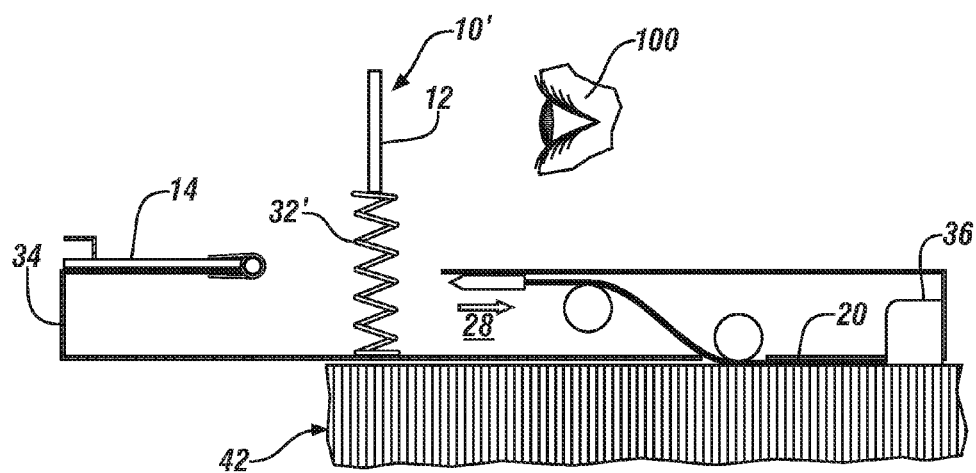

In its room temperature martensite phase, SMA wire 20 may be extended by some fraction of its length, typically about 5% or so without inducing permanent damage. On heating to a temperature range, where the shape memory alloy martensite phase will transform to a high temperature austenite phase, the flexible linkage will, as it transforms, revert to its shorter, unstretched length. Thus, if the temperature of at least that portion of SMA wire 20 in contact with lamination stack 42 is raised above the martensite to austenite transformation temperature, wire 20 will decrease in length. Since one end of wire 20 is secured to mounting block 36, the decrease in length of that section of wire 20 in contact with the lamination stack will cause plunger to retract in the direction of arrow 28 and disengage from recess 18. Disengagement of plunger 16 from recess 18 will enable door 14 to rotate about hinge 22 under the urging of torsional spring 24. As door 14 swings out of the way, visual indicator 12 may rotate to a generally vertical position and expanding spring 32' may extend so that flag 10' extends above the surface of supporting structure 34 and visual indicator 12 is clearly visible to observer 100 as shown in FIG. 2B.

By tailoring the temperature, at which the SMA transforms from martensite to austenite to a lamination stack temperature indicative of an impending overheating of the weld gun transformer, the appearance of flag 10' may serve as an indicator of such impending heating situation.

Once deployed the flag may remain in its visible orientation without application of power, so that even if the flag remains unobserved for some time, the flag will continue to signal that an over-temperature event has occurred. Advantageously, the flag deployment mechanism may be simply re-latched, without tools or special equipment, by re-stretching the SMA wire when the equipment cools. Thus, to distinguish between persistent over-temperature events indicative of impending equipment failure and transitory over-temperature events resulting from, for example, a momentary overload, it is simply necessary to re-latch the mechanism and again operate the equipment to see if the flag again deploys. Of course, such re-latching capability generally enables re-use of the over-temperature device so that it may be readily moved from machine to machine if required.

The utility of this approach depends upon the availability of a series of SMA alloys with a range of transformation temperatures appropriate to the need to signal an impending failure. Fortunately, shape memory behavior has been observed in a large number of alloy systems including Ni—Ti, Cu—Zn—Al, Cu—Al—Ni, Ti—Nb, Au—Cu—Zn, Cu—Zn—Sn, Cu—Zn—Si, Ag—Cd Cu—Sn, Cu—Zn—Ga, Ni—Al, Fe—Pt, Ti—Pd—Ni, Fe—Mn—Si, Au—Zd, and Cu—Zn and phase transformation may occur over the temperature range of from between about −100° C. to about +150° C. or so, with specialized alloys transforming at up to about 250° C. Although such theory is not relied upon, there is some indication that the transformation temperature may be correlated with the ratio of valence electrons per atom.

Of these many compositions, alloys of nickel and titanium in near-equi-atomic proportion enjoy the widest use, but even here minor changes in composition may induce significant differences in transformation temperature. For example changing the nickel/titanium ratio of the alloy from about 0.96 to about 1.04 may change the transformation temperature from about plus 70° C. to about minus 100° C. Thus it is feasible to 'tailor' the properties of an SMA so that transformation occurs at whatever pre-selected temperature best correlates with the device temperature which provide the most reliable indication of impending failure.

FIGS. 1A and 1B showed the principal operating components of an exemplary or generic SMA-based overheat detecting device. FIGS. 2A and 2B showed a similar SMA device incorporated into a representative sheet metal device housing and supporting structure 34. The structure and overheat detecting device may each be made modular so that any overheat detecting device may be inserted into any structure. Such an approach would be advantageous in that any of a series of overheat detecting devices, each intended for use at a different temperature could be married to any of a group of housings, each shaped for application to a specific piece of equipment as required. This may reduce the number of assembled devices required to be maintained in stock.

It will be appreciated that, as noted earlier, the pre-selected trigger temperature of the active material device may vary, depending on the placement location. Thus if it were feasible to place the SMA device of FIGS. 1A and 2A directly on the transformed windings, rather than the lamination stack, an SMA device with a different pre-selected temperature might be required. Similarly if the transformer is forced-air cooled, an SMA device of yet different pre-selected temperature might be placed in the path of the cooling air exhaust stream. This opportunity to select alternate temperature-sensing locations may be beneficial when the primary temperature-sensing location is less accessible and where a deployed flag is correspondingly less visible. The pre-selected temperature appropriate to any specific machine location may be established experimentally or through computer modeling.

Figure 3A:
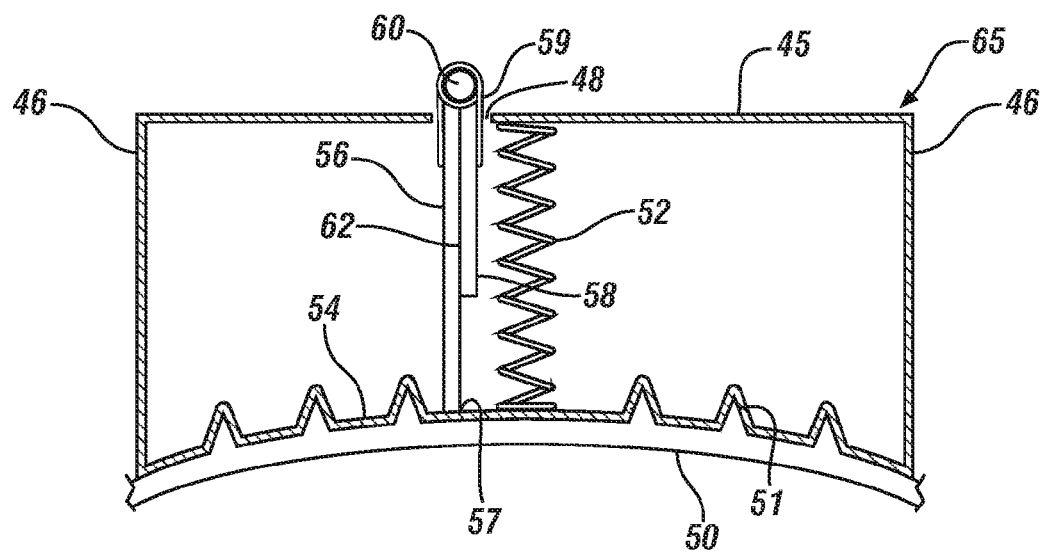
FIGS. 3A and 3B show, in sectional views, an active material device incorporating a flag or similar visual indicator employing a shape memory polymer (SMP). The device is here shown in thermal communication with a portion of the casing of an electric motor, representative of the manufacturing equipment to which the active material device may be applied.
Figure 3B:
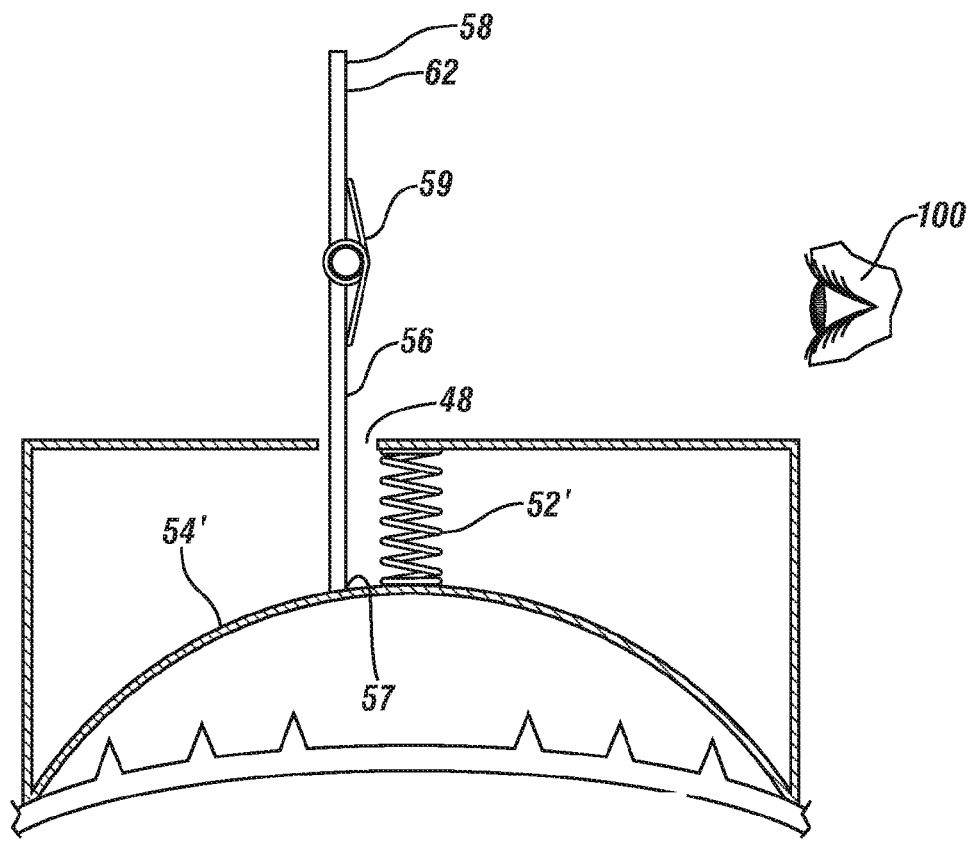

An alternative active material approach to detecting over-temperature and incipient failure, here using a shape memory polymer or SMP is shown in FIGS. 3A and 3B. Shape memory polymers with a 'remembered' shape may be heated above their glass transition temperature, formed into an alternative shape and have the alternative shape temporarily 'frozen' by cooling below the glass transition temperature. The temperature at which permanent shape recovery occurs may be selected, by engineering the composition and structure of the SMP, to be between about −63° C. and about 120° C. or greater, but suitable temperatures may range from about 50° C. to 110° C. or so in this application.

Depending on a desired overheat transformation temperature range for the active polymer material, suitable shape memory polymers include thermoplastics, thermosets, inter-penetrating networks, semi-interpenetrating networks, or mixed networks. The polymers may be a single polymer or a blend of polymers. Suitable polymer components to form a shape memory polymer include, among many others, polyphosphazenes, polyamides, polyester amides, polyanhydrides, polycarbonates and polyacrylates. Many shape memory polymer compositions comprise a mixture of two polymer systems or phases, each with its own glass transition temperature, one lower and one higher.

In FIG. 3A, a box-like active material device 65, shown in section, comprises a rigid top plate 45 and similarly rigid walls 46. Lower plate 54 comprises an SMP sheet formed into an alternative shape as described above, preferably a shape enabling good thermal communication between the SMP and the device to be evaluated. In the example shown this may be an electric motor whose casing 50 has cooling fins 51. Device 65 also comprises a folded flag 58, attached, through a pivot 60 to post 56 attached at its end 57 to formed SMP sheet 54. Spring 59 acts on flag 58 and post 56 at pivot 60 and seeks to unfold or open flag 58 so that its interior surface 62 which comprises a visual indicator may be made visible. But post and flag extend through a close-fitting opening 48 in top plate 44 which interferes with and prohibits the opening of flag 58.

However, when motor casing 50 reaches the pre-selected temperature corresponding to the glass transition temperature of the SMP lower plate 54, lower plate 54 will seek to reconfigure itself into its remembered shape 54' (FIG. 3B) assisted by pre-tensioned spring 52 (FIG. 3A) which relaxes into its unloaded configuration 52' (FIG. 3B) to develop a marked curvature in SMP lower plate 54'. As the SMP lower plate transforms from the configuration of 54 to that of 54' it elevates post 56 and its attached flag 58. When post 56 and flag 58 clear opening 48, spring 59 opens flag 58 exposing surface 62 and making the visual indicator visible to observer 100. It will be appreciated that that the particular flag and post configuration shown are intended to be exemplary and illustrative of the approach, rather than limiting. For example, post 56 may have a latch, interfering with, and securing a spring-loaded flag mounted on top plate 44 like the prior embodiment shown at FIG. 2A. In this arrangement displacing post 56 would progressively minimize interference and, at some pre-selected displacement release flag 58 and render the visual indicator of interior surface 62 visible. In still another embodiment, an SMP with two glass transition temperatures may be used its stiffer low temperature form to retard release of a warning flag. But when the SMP actuator is heated above the lower of its two glass transition temperatures it softens and deforms, permitting release of the flag by action of a suitable spring arrangement.

Figure 4A:
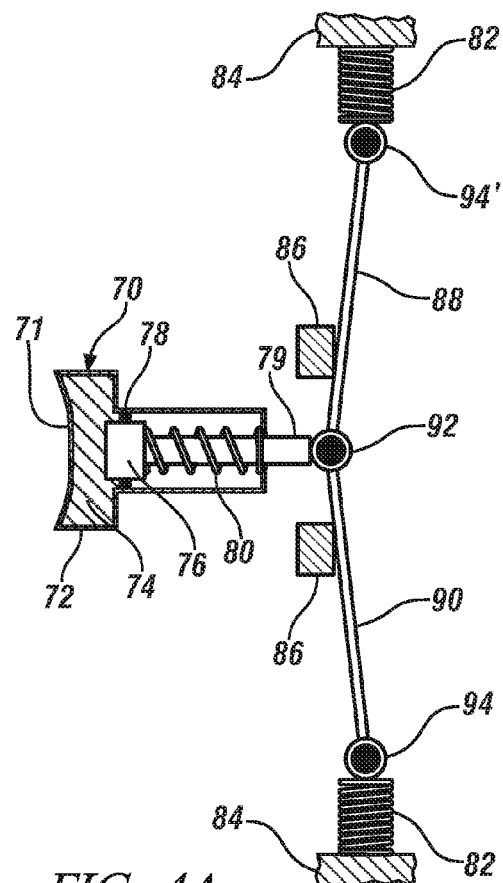
FIGS. 4A, 4B and 4C show in sectional views an active material device incorporating a flag or similar visual indicator employing a paraffin actuator.
Figure 4B:
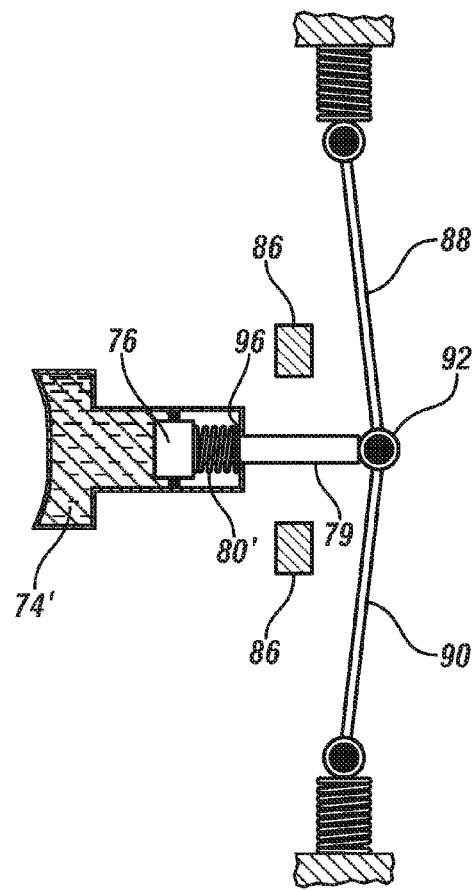
Figure 4C:
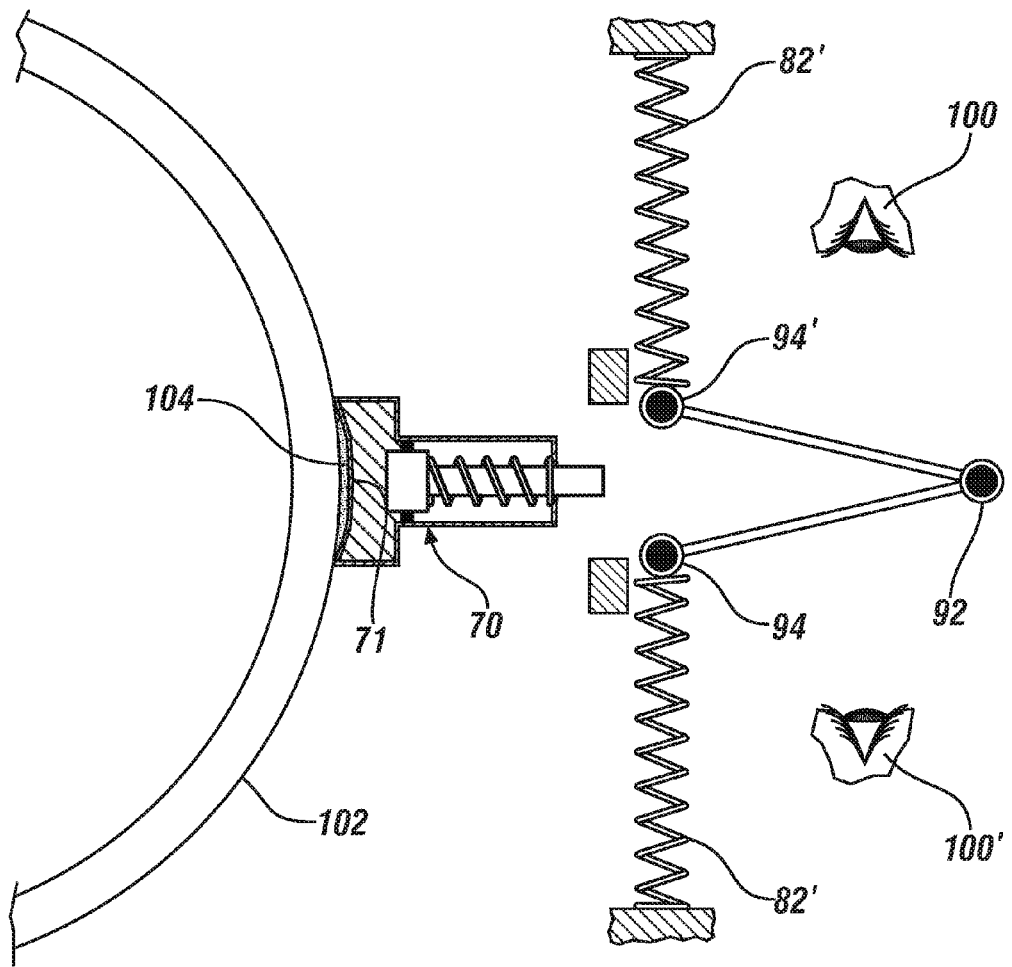

A further smart material-powered device is shown in FIGS. 4A, 4B and 4C. These examples illustrate the use of a paraffin-based actuator. Paraffin may exhibit up to a 40% increase in volume on melting and this volume change may be exploited by containing the paraffin within a sealed cylinder where the volume change may apply pressure to, and displace, a piston. In the arrangement of FIG. 4A, paraffin-based actuator 70 comprises a cylinder 72, containing paraffin 74. Cylinder 72 is of variable diameter intended to maximize displacement and is shown with a shaped base 71 intended, as shown at FIG. 4C to better conform to the geometry of the equipment under test. Paraffin 74 acts on piston 76 sealed against the cylinder wall by seals 78. Piston 76 comprises plunger 79 and piston 76 and is acted on by return spring 80 supported by end wall 96 (FIG. 4B). Plunger 79 acts on center pivot 92 attaching generally flat flags 88, 90 to one another. Flags 88, 90 may themselves serve as visual indicators or may incorporate visual indicators (not shown) as separate elements. Flags 88, 90 are maintained in an over-center configuration against stops 86 by springs 82 positioned between supports 84 and end pivots 94, 94'. In FIG. 4B, an over-temperature condition has resulted in the melting of paraffin 74', advancing piston 76 and bringing plunger 79 into contact with center pivot 92 and compressing return spring 80'. The displacement of center pivot 92 resulting from the advance of piston 76 carries flags 88, 90 out of contact with stops 86 and carries pivot 92 beyond the over-center position. In this configuration springs 82' (FIG. 4C) may cooperatively continue to advance end pivots 94, 94' toward one another 'buckling' flags 88, 90 about center pivot 92 and raising the flags for easy viewing, from either side, by observers 100, 100'. Preferably the motion of end pivots 94, 94' is guided by a rail or similar structure (not shown).

As shown in FIG. 4C, the equipment has cooled so that its exterior surface 102, which may, for example, be a bearing shell, has likewise cooled, resulting in the cooling of paraffin actuator 70 and returning it to the configuration of FIG. 4A. Flags 94, 94' however remain displayed under the urging of springs 82'. As noted earlier, shaped base 71 is intended to generally conform to surface 102 to enhance heat transfer and minimize the time required for the paraffin to melt. Where further enhancement of heat flow is desired or required, some conformable thermally conductive medium, such as thermal grease, may be positioned between surface 71 and equipment surface 102 as shown at 104.

Figure 5:
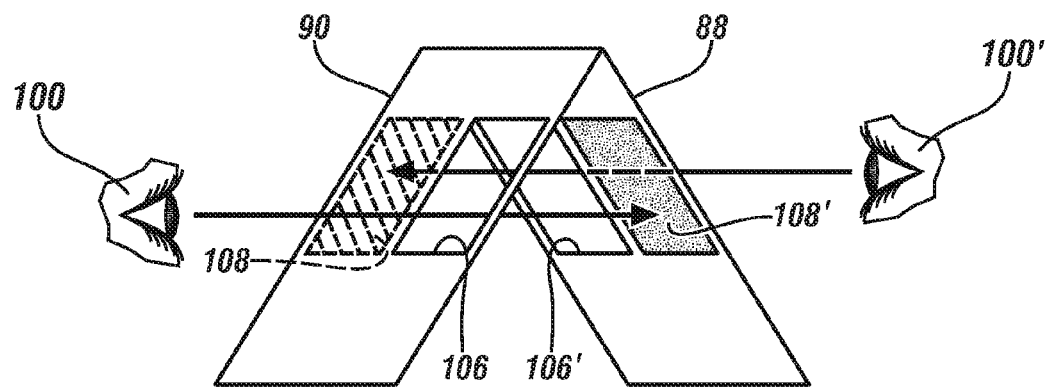
FIG. 5 is a pseudo-perspective view of the flag portion of FIGS. 4A-C illustrating how, with appropriate windowing, the flag(s) may be rendered invisible in its (their) stored position but visible to an observer when deployed.

At some viewing angles flags 88, 90 may be visible even in the 'stored' position shown in FIG. 4A, potentially leading to confusion as to whether or not they are deployed as shown at FIG. 4C. This confusion may be eliminated by concealing the flags, in their stored configuration, below a tear-able sheet, of say paper, which will be ripped aside as the flags deploy. Alternatively a 'windowed' design as shown in FIG. 5 may be used. In this embodiment separate visual indicators 108, 108' are located on the underside of the flags and therefore unobservable in the stored position, but readily observed by observers 100, 100' through windows 106, 106' in the deployed position.

By suitable choice of paraffin, or paraffin mixtures, melting may be promoted over a wide range of temperatures. Paraffins are alkanes (general composition $C_nH_{n+2}$) which are solid at ambient temperature or at about 25° C. or so. The melting point of alkanes generally increases with carbon number (n) and the first alkane generally considered to be a paraffin has a carbon number (n) of 18 and a melting point of about 28° C. More commonly though, paraffin actuators may employ alkanes with carbon numbers ranging from about 20 to 60-80 to provide a useful operating temperature range of from about 35° C. to about 110° C.

All of the flag embodiments shown have been passive in that they have required no continuing source of electrical power to operate. However the long shelf life of high-performance batteries makes it feasible to supplement the visual indication provided by the embodiments shown with an electrically-powered visual, audible or computer-based alert.

Figure 6:
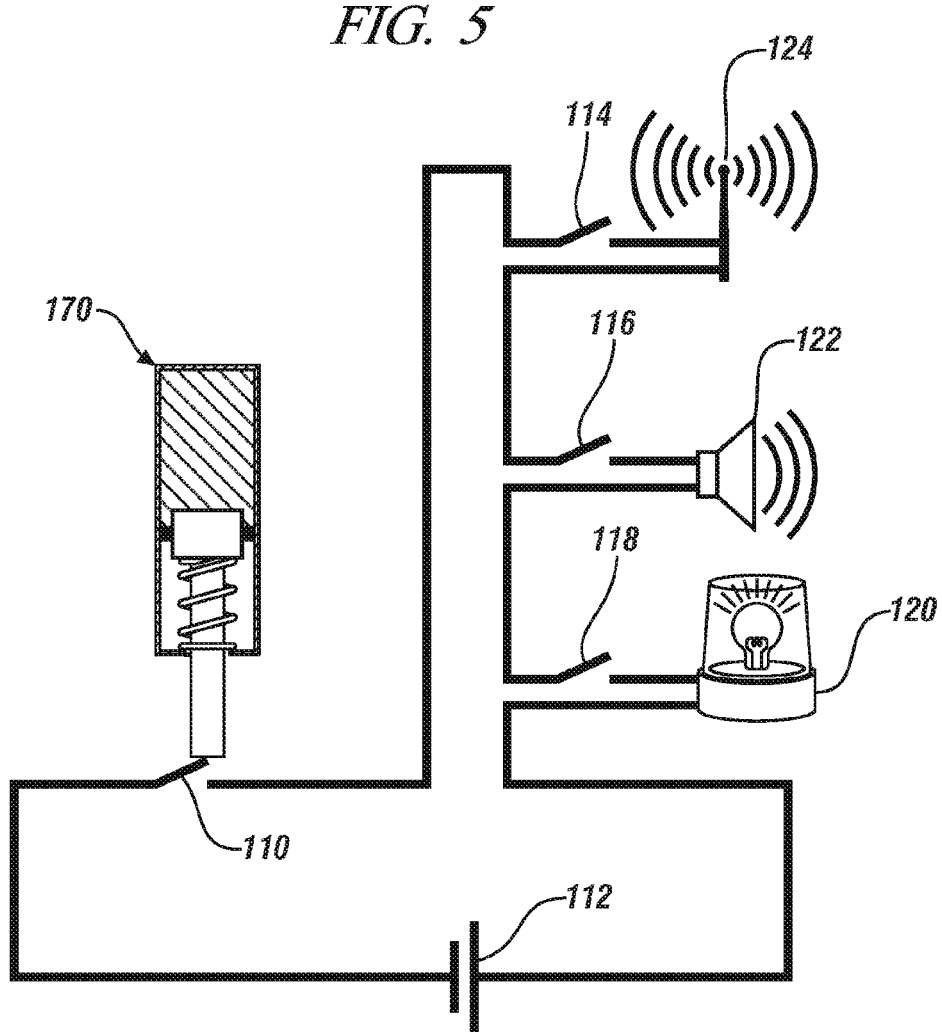
FIG. 6 is a schematic of an electrical circuit for use in conjunction with a visible flag or alone to provide a visible or audible alarm or to wirelessly communicate an alarm to a central station.

An illustration of this approach is shown in FIG. 6, which has been simplified by eliminating the flag deployment mechanism which would operate in parallel with the electrically-powered alert. Here a smart material actuator, shown, for convenience only, as a constant diameter cylinder paraffin actuator 170, will, when actuated, operate directly on and close switch 110 enabling power from battery 112 to activate one or more selected alerts. Without limitation these are shown as a visual flasher device 120, an audible device 122 and a transmitter 124 for sending an alert to a central or remote location which may include a computer management system to log or otherwise record the alert. The particular alerts may be selected by closing any or all of switches 114, 116 and 118. Advantageously such supplemental alarm(s) may be conveyed at locations remote from the machine and device, for example, at a central station which is monitored on a regular schedule.

In the configuration shown, where the electrical circuit is closed by the active material element directly a temporary over-temperature condition which causes the plunger of paraffin actuator 170 to retract will open switch 110 and discontinue the alarm. This may be overcome by using a latching circuit, not shown, but well known to those skilled in the art, to enable the alert to continue irrespective of the state of switch 110 after it has been closed.

A simpler approach is to actuate the switch through the flag since the flag deployment mechanism, once activated, acts as a mechanical latch, intended to maintain a flag, and its visual indicator in its deployed configuration independently of the state of the active material actuator. All of the embodiments shown in any of FIGS. 2A/B, 3A/B and 4A/B/C incorporate such a mechanical latch to ensure continued visibility of the flag or visual indicator and so, if combined with these embodiments, switch 110 would always remain closed until the mechanical latch is reset.

For example, by positioning the switch 110 between stop 26 and door 14 (FIG. 1B), the opening of door 14 would automatically close the electrical circuit and continue to maintain it closed until door 14 is manually closed and plunger 16 re-engages recess 18.

Practices of the invention have been described using certain illustrative examples, but the scope of the invention is not limited to such illustrative examples.

The invention claimed is:

1. A device for placement in thermal conduction contact with a machine, the device serving to detect and give notice of an over-heating condition in the machine when the machine is operating or has been operating; the device comprising:

a shaped body of an active material that is composed to experience a phase transformation, or undergo a glass transition, producing a shape, stiffness, or volume change when it is heated to a predetermined temperature, indicative of an over-heating condition in a machine when the device is placed in thermal conduction contact with the machine, the shaped body of active material being located in the device for heat transfer from the machine;

a flag-member with a surface area for displaying a visible indication of overheating in the machine, the flag-member being maintained in a stored position in the device when the machine is not in a over-heating condition, the flag-member being movable to an alarm-giving position by activation of the active material when the active material is heated to its predetermined temperature by thermal contact with the machine and experiences its shape-, stiffness-, or volume-changing phase transformation or glass transition.

2. The device as recited in claim 1 in which the device has a surface for surface-to-surface contact with a surface of the machine.

3. The device as recited in claim 1 in which the device further comprises a spring in contact with the flag-member and serving to move the flag-member to its alarm-giving position upon actuation of the heated active material.

4. The device as recited in claim 3 in which the device further comprises a member for holding the flag-member in its stored position against the force of the spring until the active material is heated to its predetermined temperature and is activated to move the holding member and enable the spring to move the flag-member to its alarm giving position.

5. The device as recited in claim 4 in which the device further comprises a member for stopping the flag-member in its alarm-giving position, the stopping member holding the flag-member against the force of the spring.

6. The device as recited in claim 4 in which the active material is a wire of shape memory alloy composition adapted to shorten its length when it is heated to a temperature indicative of an overheating condition in the operation of the machine, the shortening of the shape memory alloy wire activating the movement of the flag-member to its alarm-giving position.

7. The device as recited in claim 3 in which the flag-member has an edge that is pivotally connected in the device such that the flag-member is moved around its edge to its alarm-giving position by a spring upon actuation of the heated active material.

8. The device as recited in claim 7 in which the active material is a wire of shape memory alloy composition adapted to shorten its length when it is heated to a temperature indicative of an overheating condition in the operation of the machine, the shortening of the shape memory alloy wire activating the movement of the flag-member to its alarm-giving position.

9. The device as recited in claim 3 in which the device further comprises a member for stopping the moving flag-member in its alarm-giving position, the stopping member holding the flag-member against the force of the spring.

10. The device as recited in claim 1 in which the active material is a wire of shape memory alloy composition with a length, a portion of the wire length being held in thermal conduction contact with the machine, the shape memory alloy wire being adapted to shorten its length when it is heated to a temperature indicative of an overheating condition in the operation of the machine, the shortening of the shape memory alloy wire activating the movement of the flag-member to its alarm-giving position.

11. The device as recited in claim 10 in which the shape memory alloy composition is an alloy of nickel and titanium.

12. The device as recited in claim 10 in which the flag-member is manually resettable to its stored position upon cooling from an overheat condition.

13. The device as recited in claim 1 in which the flag-member is manually resettable to its stored position upon cooling from an overheat condition.

14. The device as recited in claim 1 in which the active material is a polymer composition in the shape of a sheet, the sheet of polymer composition shaped and adapted to respond to heat emanating from an operating machine by transitioning to a softened condition when it is heated to a temperature indicative of an overheating condition in the operating machine, the softened condition of the polymer composition sheet activating the movement of the flag-member to its alarm-giving position.

15. The device as recited in claim 14 in which the flag-member is manually resettable to its stored position upon cooling from an overheat condition.

16. The device as recited in claim 1 in which the active material is a body of organic paraffin composition, contained as a first volume at a temperature below the overheating temperature of the machine, the body of paraffin composition experiencing a volume increase when it is heated to a temperature indicative of an overheating condition in the operation of the machine, the volume increase of the paraffin composition being sufficient to activate the movement of the flag-member to its alarm-giving position.

17. The device as recited in claim 16 in which the device further comprises a piston that is actuated by a volume increase in the paraffin composition to move the flag-member to its alarm-giving position.

18. The device as recited in claim 16 in which the flag-member is manually resettable to its stored position upon cooling from an overheat condition.

19. The device as recited in claim 1 in which the device comprises an electrical connection that is activated by movement of the flag-member to its alarm-giving position to prompt issuance of a further alarm signal by a separate means, remote from the machine and the subject device.

20. The device as recited in claim 1 in which the device comprises an electrical connection that is activated by movement of the flag-member to its alarm-giving position to issue an alarm signal to a computer management system, remote from the machine and the subject device.

* * * * *